United States Patent [19]

Obermeyer

[11] Patent Number: 4,754,155
[45] Date of Patent: Jun. 28, 1988

[54] HYDROELECTRIC GENERATOR HAVING RETRACTABLE RUNNER

[76] Inventor: Henry K. Obermeyer, 36 Wickhams Fancy, Rivers Edge Rd., Collinsville, Conn. 06022

[21] Appl. No.: 57,539

[22] Filed: Jun. 2, 1987

[51] Int. Cl.⁴ .............................................. F03B 3/02
[52] U.S. Cl. ...................................... 290/52; 290/54
[58] Field of Search ........................... 290/43, 52, 54; 415/2 A, 3, 131, 140

[56] References Cited

U.S. PATENT DOCUMENTS

| | | | |
|---|---|---|---|
| 3,184,218 | 5/1965 | Hochwalt et al. | 290/52 X |
| 3,226,084 | 12/1965 | Kanger | 290/52 X |
| 4,289,971 | 9/1981 | Ueda | 290/52 |
| 4,319,142 | 3/1982 | Mayo, Jr. | 290/52 |
| 4,468,153 | 8/1984 | Atencio | 290/52 X |
| 4,654,537 | 3/1987 | Gaspard | 290/54 |

Primary Examiner—William M. Shoop, Jr.
Assistant Examiner—W. E. Duncanson, Jr.
Attorney, Agent, or Firm—Victor E. Libert

[57] ABSTRACT

A hydroelectric generator is provided with a retractable runner and, optionally, with a retractable distributor. This is accomplished by mounting the runner on a runner shaft which is axially movable in order to permit selective retraction and extension of the runner exteriorly of the generator housing. In this way, the runner may be selectively withdrawn from the inlet to its associated draft tube in order to clear the inlet and increase its water flow rate capacity during periods of flood or excessive high water. The distributor, i.e., the wicket gates, may optionally also be carried on the runner shaft for axial retraction and extension therewith.

14 Claims, 7 Drawing Sheets

HYDROELECTRIC GENERATOR HAVING RETRACTABLE RUNNER

BACKGROUND OF THE INVENTION

The present invention is concerned with hydroelectric generators of the type having a blade arrangement, usually referred to as a runner, mounted on a shaft which rotates the rotor of an electric generator contained within a housing. Water is flowed through a distributor to rotate the runner and thus turn the shaft for the generation of electricity.

Such devices generally comprise a distributor through which water is flowed to impart a tangential momentum to it for impingement upon a runner for rotating the runner and thereby the runner shaft. The runner, which may be encircled by the distributor or positioned immediately downstream of it, is conventionally positioned at the inlet to a draft tube through which the water flows for discharge as tail water downstream of the powerhouse in which the generator is located.

Many dams and powerhouse sites require the provision of a waste water, i.e., overflow water, conduit to accommodate discharge of water in order to control the water level as desired during flood or very high water flow periods. It would be advantageous to generate power from such overflow water by installing a generator in the (or in each) overflow conduit. However, the installation of a hydroelectric generator in such an overflow conduit significantly reduces the maximum flow rate capacity of the conduit because of the constriction of the inlet by positioning of the runner and its associated distributor at the inlet. For smaller generators it may be feasible to simply remove the entire generator, or at least withdraw it from the discharge inlet a distance sufficient to clear the inlet to accommodate higher rates of flow of water through the overflow conduit. However, such removal or repositioning is not feasible for large machines which may weigh 50 tons or more. One solution would be to provide an extra overflow conduit to accommodate flow in excess of that which can be handled by the generator-equipped overflow conduit. However, this involves the expense of constructing a second waste water conduit, equipping the system with necessary flow gates, valving and associated controls, etc. Further, such expedient is usually not feasible in existing installations where a single, large diameter waste water discharge conduit may be available and there is not room sufficient to install a second conduit, or the cost of doing so is prohibitive.

The present invention provides a means for overcoming the aforesaid difficulties.

SUMMARY OF THE INVENTION

In accordance with the present invention there is provided an improvement in a hydroelectric generator of the type comprising a housing, a rotatable runner shaft mounted on the housing and having a runner mounted in an axially fixed location on the runner shaft exteriorly of the housing for rotation of the runner shaft with the runner, the runner shaft being drivingly connected to an electromotive machine for operation thereof. The improvement comprises that the runner shaft be mounted for axial movement relative to the housing, and shaft positioning means, e.g., hydraulic shaft positioning means, be connected with the runner shaft to enable selective axial positioning of the runner shaft, and thereby of the runner, relative to the housing.

In one aspect of the invention, the shaft positioning means comprises a piston head carried on the runner shaft for movement of the runner shaft with the piston head, the piston head being mounted for sliding movement within a cylinder chamber. One or more hydraulic conduits connect a source of hydraulic fluid to opposite sides of the piston head within the cylinder chamber, and pump means are connected in flow communication with the conduits to pressurize the hydraulic fluid for selective axial positioning of the piston head and thereby of the runner shaft.

In accordance with another aspect of the invention, the runner shaft is a compound shaft comprising (a) a first shaft having a runner end at which the runner is carried and an opposite, piston end at which the piston head is carried, and (b) a second shaft having a connector end which is drivingly connected to the piston end of the first shaft, and a machine end which is drivingly connected to the electromotive machine; the first and second shafts being drivingly connected to each other by an axially accommodating connector, i.e., a slide pin connector, to accommodate axial movement of the first shaft relative to the second shaft.

Still another aspect of the invention provides distributor means disposed about the periphery of the runner and connected with the runner shaft for axial movement of the distributor means with the runner shaft. In a different aspect of the invention, the distributor means disposed about the periphery of the runner are mounted independently of axial movement of the runner shaft whereby the positon of the distributor means is independent of axial positioning of the runner shaft.

The generator as described above may, in accordance with an aspect of the invention, be mounted vertically with the runner at the bottom thereof and positioned at the inlet of a draft tube.

Other aspects of the invention, which generally provide for a hydroelectric generator having an axially positionable runner and, optionally, an axially positionable distributor, will be apparent from the following description and the drawings described therein.

DETAILED DESCRIPTION OF THE INVENTION AND SPECIFIC EMBODIMENTS THEREOF

Figure 1:
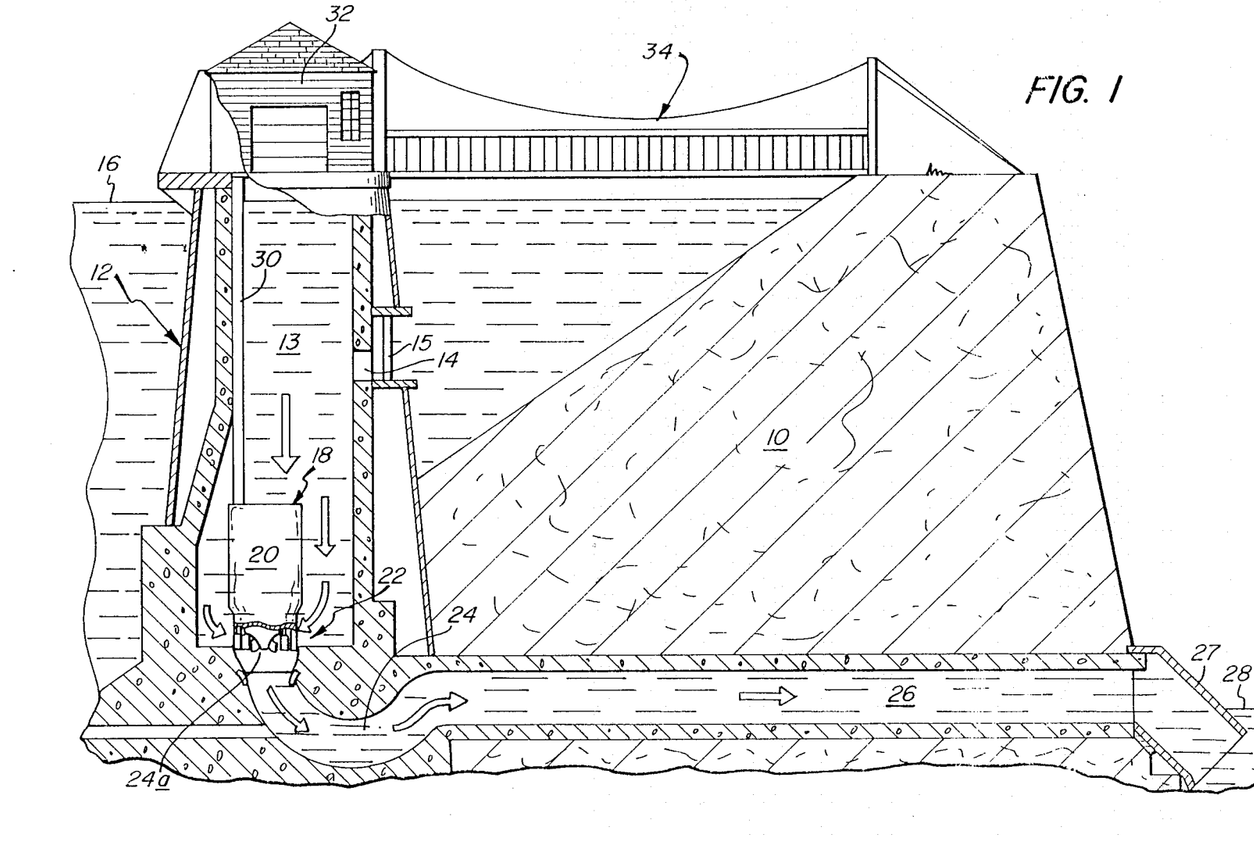
FIG. 1 is a schematic side elevation view, partially in cross section, of a dam site including a water tower having a vertically mounted generator therein.

Referring now to FIG. 1, which, like the other Figures, is schematic and not drawn to scale, there is shown in cross section a dam 10 having a water tower 12 positioned on the upstream side of the dam and containing one or more water inlets. A typical water inlet is shown at water inlet 14 which is provided with a trash rack 15 to screen out any debris or ice contained in the water flowing through it. Under the head of water provided by upstream (of the dam 10) water level 16, water flows into water inlet 14 then through inlet conduit 13 in tower 12 in the direction shown by the unnumbered arrows. The water flows around the housing 20 of hydroelectric generator 18, and through the distributor end 22 thereof to turn the generator runner and its shaft, then into draft tube 24 via inlet 24a thereof, thence through conduit 26 and discharge conduit 27 for discharge into tail water 28. Power and control cables are routed through a water-tight pipe 30 to a tower house 32 surmounting water tower 12. A bridge 34 is supported at one end by water tower 12 and a its other end by the top of dam 10 and serves as a support for power cables (not shown) through which the electricity generated by hydroelectric generator 18 is transmitted for distribution. Bridge 34 also provides for access between the top of the dam 10 and tower house 32.

Figure 1A:
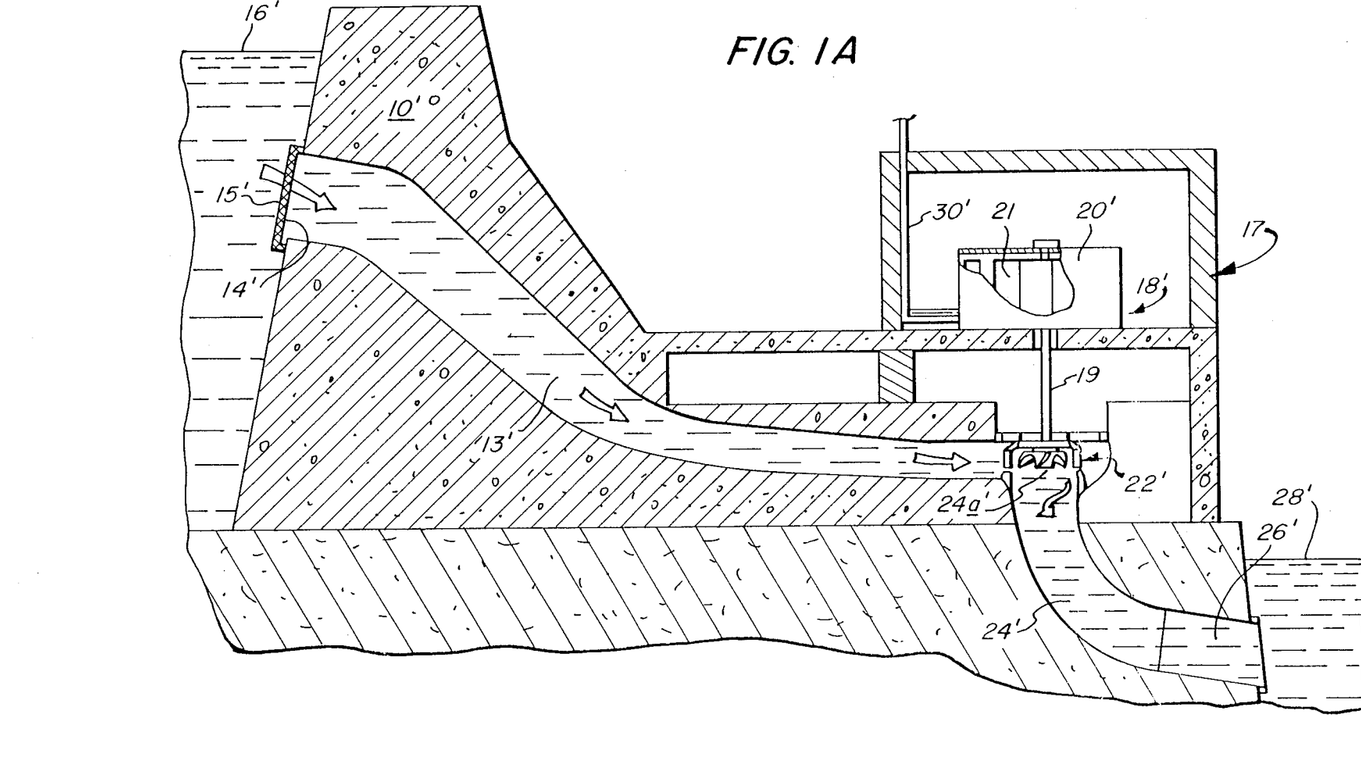
FIG. 1A is a partial schematic view generally corresponding responding to that of FIG. 1 but showing an alternate type of vertical hydraulic generator installation.

The foregoing described construction is conventional in the art and illustrates utilization of a vertically-positioned generator of the type in which the electromotive machine is contained within a housing 20 over which the water is flowed to turn a runner positioned at the bottom of the machine. In another conventional installation of a vertically positioned hydroelectric generator, the distributor end thereof may be connected by an extended shaft to an electromotive machine positioned at an elevation high enough above the distributor end to be out of the flow of water. This is schematically illustrated in FIG. 1A in which parts corresponding to those of FIG. 1 are identically numbered except for the addition of a prime indicator thereto. Thus, a dam 10' has an inlet conduit 13' through which water is introduced via water inlet 14' which is equipped with a trash rack 15'. A hydroelectric generator 18' includes a housing 20' containing an electromotive machine 21 and mounted on the floor of a power house structure 17. An extended runner shaft 19 drivingly connects the electromotive machine 21 to a runner located at the distributor end 22' of generator 18'. Water flows under the pressure head of upstream (of the dam) water level 16' through conduit 13' thence through distributor end 22' to rotate the runner mounted at the bottom of runner shaft 19, then into draft tube 24' via draft tube inlet 24a'. The water is discharged through water conduit 26' as tail water 28'. Power generated by generator 20' is conducted for distribution by cables in pipe 30'. While the invention is applicable to any size of hydraulic generator, it is particularly useful for large machines, for example, for machines sized to be installed in a conduit in which the inlet (corresponding to 24a in FIG. 2) is, for example, from five to twelve feet in diameter.

Figure 2:
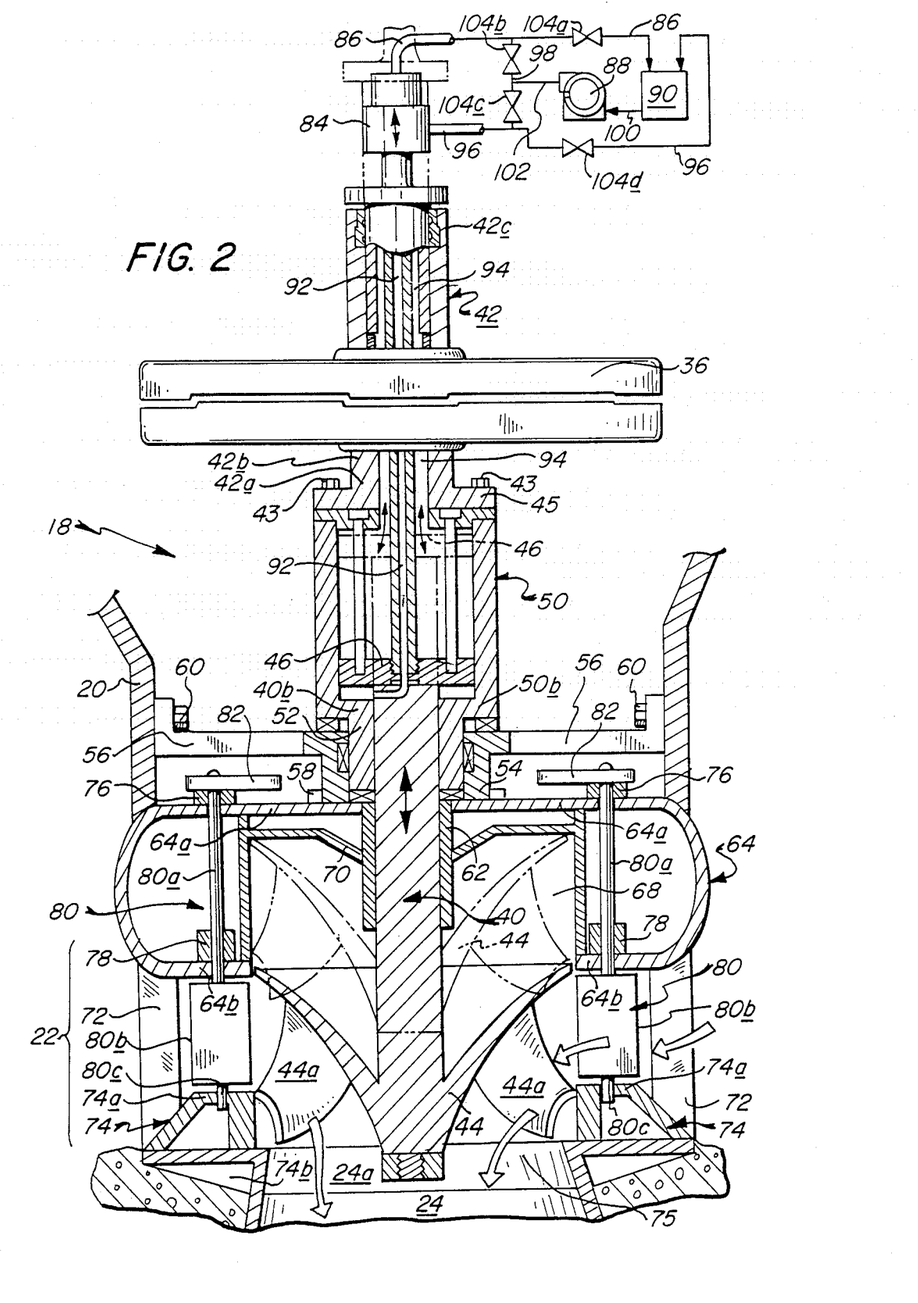
FIG. 2 is a schematic cross-sectional partial view in elevation of a hydraulic generator having shaft positioning means enabling selective axial positioning of the turbine runner in accordance with one aspect of the present invention.
Figure 2A:
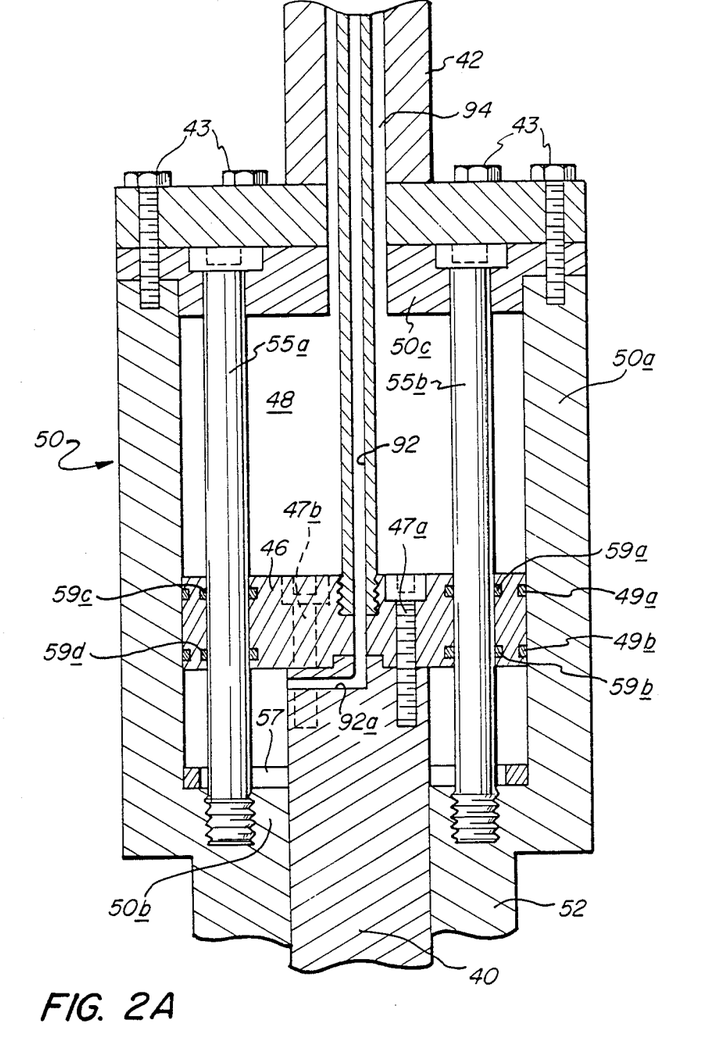
FIG. 2A is a partial cross-sectional view in elevation showing the shaft positioning and axially accommodating connector means of FIG. 2 on an enlarged scale.

Referring now to FIG. 2, a conventional electromotive machine 36 is contained within the housing 20 and is drivingly connected to runner shaft 38 which, in the illustrated embodiment, is drivingly connected to the rotor (not shown) of machine 36. That is, shaft 38 is connected to the rotor of machine 36 in a manner that the rotor is compelled to rotate as the shaft 38 rotates, all in the known manner. In this embodiment, runner shaft 38 is a compound shaft comprised of a first shaft 40 and a second shaft 42. The first shaft 40 has a runner end 40a on which a runner 44 carrying runner blades 44a is mounted so that rotation of runner 44 will cause first shaft 40 to rotate with it. Runner 44 is also mounted axially fixedly on first shaft 40, that is, runner 44 is mounted at a fixed axial location on first shaft 40. As best seen in FIG. 2A, first shaft 40 has an opposite, piston end 40b on which is mounted a piston head 46. Piston head 46 is fixedly mounted on first shaft 40 by bolts 47a, 47b (FIG. 2A) and is carried within a cylinder chamber 48 defined by cylinder 50, comprised of cylinder wall 50a, cylinder floor 50b and cylinder roof 50c. Piston head 46 is equipped with fluid seal rings 49a, 49b on its side walls (unnumbered) and is sized for reciprocating, sliding movement within cylinder chamber 48 as described in more detail below. A stop ring 57 is positioned at the bottom of cylinder chamber 48 to limit downward movement of piston head 46. A connector sleeve 52 extends from cylinder floor 50b and is rotatably received within journal sleeve 54. Journal sleeve 54 is supported at its upper end by bearing support vanes 56 affixed to the interior of housing 20 by bolts 60 and at its lower end by a retaining ring 58 affixed to head cover 64a. A pair of slide pins 55a, 55b are mounted within cylinder chamber 58 by being passed through suitably aligned bores formed, respectively, within cylinder roof 50c and cylinder floor 50b. The bores in cylinder floor 50b may be threaded to receive threads on the bottoms (as viewed in FIG. 2A) of slide pins 55a, 55b. More than the two slide pins illustrated may be employed, if desired. Pins 55a, 55b also pass through smooth bores (unnumbered) formed in piston head 46 in alignment with the bores in the cylinder roof and cylinder floor so that, as explained in detail below, rotation of first shaft 40 will constrain cylinder 50 to rotate therewith. Slide pins 55a and 55b in this embodiment also comprise, in cooperation with the bores in piston head 46, an axially accommodating connection to accommodate axial movement of first shaft 40 towards and away from second shaft 42. The smooth bores in piston head 46 are sized to permit axial sliding movement of piston head 46 over slide pins 55a, 55b. Seal rings 59a, 59b and 59c, 59d are provided around, respectively, slide pins 55a and 55b.

In FIG. 2A, first shaft 40 is shown close to the runner extended position illustrated in solid lines in FIG. 2. During normal operation of the turbine, the runner will of course be in its fully extended position with piston head 46 seated upon stop ring 57, which stops piston head 46 at the runner extended position with the outlet 92a of first hydraulic fluid conduit 92 clear of the cylinder floor 50b. First shaft 40 is rotatably mounted within lower guide bearing 62 which is affixed at its upper end to the head cover 64a of a distributor support collar 64. Distributor support collar 64 has a central aperture therein through which first shaft 40 passes and within which the upper end of lower guide bearing 62 is mounted. First shaft 40 is thus axially slidable within connector sleeve 52 and lower guide bearing 62 and, because of the connection afforded by slide pins 55a, 55b, rotation of first shaft 40 by runner 44 constrains cylinder 50 to rotate with first shaft 40. Generally, axial travel of the runner shaft, or of a component shaft thereof, e.g., first shaft 40, may be accommodated by any suitable axially accommodating connection, i.e., by a connection which accommodates axial shifting of the runner shaft or of a component thereof. For example, second shaft 42, or a unitary runner shaft, could be axially slidably mounted within the rotor of machine 36.

A reinforcing cylinder 68 connects head cover 64a to an annular rim 64b. A bearing support 70 is generally of disc shape and is joined at its periphery to the interior of reinforcing cylinder 68; bearing support 70 has a recess or dimpled central portion in which is formed an aperture which receives and supports bearing ring 62. The distributor support collar 64, which is of generally toroidal configuration, is supported by a plurality of fixed stay vanes 72 distributed about the periphery thereof and in turn supported upon a bottom plate 74 fitted into the inlet end 24a of draft tube 24 (FIG. 1). Bottom plate 74, which has a top portion 74a of annular configuration encircling draft tube inlet 24a, is supported upon an embedment ring 75 which is embedded in concrete. To this end, embedment ring 75 has a plurality of web-like embedment members 75a formed at the lower end thereof to facilitate embedding ring 75 in concrete at the entry to draft tube 24.

A plurality of first bearings 76 is mounted in a circular arrangement upon head cover 64a of distributor support collar 64 and, directly below each of first bearings 76 a corresponding one of a plurality of second bearings 78 is mounted within distributor support collar 64 upon annular rim 64b thereof. Each of bearings 76 and 78 has a bore extending therethrough and through its associated supporting member, i.e., the bores through first bearings 76 also extend through head cover 64a, and the bores through second bearings 78 also extend through annular rim 64b. A plurality of bores is also formed in the top portion 74a of bottom plate 74. Corresponding sets of three of these bores (in the head cover 64a, annular rim 64b and top portion 74a, respectively) are vertically aligned for mounting a plurality of wicket gates 80 on distributor support collar 64 and bottom plate 74. Each wicket gate 80 comprises an upper post 80a to which is affixed a rigid flap-like gate member 80b. A mounting stub 80c protrudes from the lower (as viewed in FIG. 2) end of member 80b and is coaxial with post 80a.

Wicket gates 80 conveniently comprise a unitary or integral structure in which gates 80b and mounting stubs 80c rotate with upper post 80a. Upper posts 80a are each connected to a linkage arm 82 which is suitably connected to control rods (not shown), movement of which will rotate wicket gates 80 to control the entry of water into distributor end 22 of generator 18. The arrangement of stay vanes 72 and wicket gates 80, together with controls for the wicket gate is conventional and well known to those skilled in the art and therefore is not further described herein.

Second shaft 42 has a connector end 42a which terminates in a disc-shaped connector 45 which is affixed to cylinder roof 50c by fastener means, e.g., bolts 43. Connecting member 45 is thus affixed to cylinder 50 so that the latter connects second shaft 42 for rotation thereof by first shaft 40. A machine portion 42b of second shaft 42 is drivingly connected to a conventional electromotive machine 36, i.e., to the rotor thereof, so that rotation of second shaft 42 will rotate the rotor for generation of electricity in the known manner.

Second shaft 42 terminates in a machine end 42c thereof to which is connected a conventional rotating-/reciprocating hydraulic union 84. A flexible connector 86 is connected to a hydraulic fluid pump which receives hydraulic fluid from a hydraulic fluid reservoir 90 and supplies it to a first hydraulic fluid conduit 92 which extends axially through second shaft 42 to piston head 46 to which it is connected thence into piston end 40b of first shaft 40 wherein it is turned 90 degrees to terminate in an opening on the first shaft side, i.e., the lower side as viewed in FIG. 2, of piston head 46. A second, annular hydraulic fluid conduit 94 is connected in flow communication with a flexible connector 96 which leads to hydraulic fluid reservoir 90. A cross connector conduit 98 connects flexible connector 86 which is also connected to hydraulic fluid reservoir 90. A hydraulic fluid supply line 100 leads from reservoir 90 to pump 88 and a pump discharge line 102 is connected to cross connector 98. Valves 104a, 104b, 104c and 104d are provided in, respectively, lines 86, cross connector line 98 and connector 96 as shown.

In operation, when it is desired to position runner 44 in its fully extended position for operation of hydraulic generator 18, valves 104b and 104d are closed and 104a and 104c are opened while pump 88 is operated to force hydraulic fluid through second, annular fluid conduit 94 and into cylindrical chamber 48 above piston head 46, the pressurized hydraulic fluid driving the piston head 46 downwardly to the position shown in solid line in FIG. 2, thereby positioning runner 44 in its lowermost, runner extended, position within distributor end 22. As thus positioned, water flowing past wicket gates 80, as indicated by the unnumbered arrows in FIG. 2, will rotate runner 44, thereby rotating first shaft 40, cylinder 50 and thereby rotating second shaft 42 and the rotor (not shown) of electromotive machine 36. The hydraulic generator 18 will thus operate normally, the wicket gates 80 being adjusted to accommodate changes in operation as may be dictated by the available water head and flow rate, as is well known to those skilled in the art. During flood or very high water conditions, when it may be desired to discharge into draft tube 24 a flow rate of water greater than that which can be flowed through distributor end 22 with runner 44 in its operating position, the runner is raised to clear the inlet 24a of draft tube 24 for a higher flow rate of water therethrough. This is accomplished by closing valves 104a and 104c and opening valves 104b and 104d, and then operating pump 88 to force hydraulic fluid downwardly through first hydraulic fluid conduit 92 past the 90 degree turn therein and into cylindrical chamber 48 on the first shaft side of piston head 46, i.e., below piston head 46 as viewed in FIG. 2. With valve 104d open, hydraulic fluid on the machine side of piston head 46, i.e., on the upper side thereof as viewed in FIG. 2, will be forced back through second, annular conduit 94 thence through flexible connector 96 into reservoir 90 and piston head 46 will be forced upwardly to it position shown in dot-dash outline in FIG. 2. First shaft 40 and its runner are constrained to move axially with piston head 46 so that runner 44 will be positioned in the retracted position shown in dot-dash outline in FIG. 2. In this position, flow of water past wicket gates 80 into inlet 24a of draft tube 24 is essentially unimpeded by runner 44 and an increased rate of water flow, greater than the highest flow rate attainable when runner 44 is in its extended position, is available.

Figure 3:
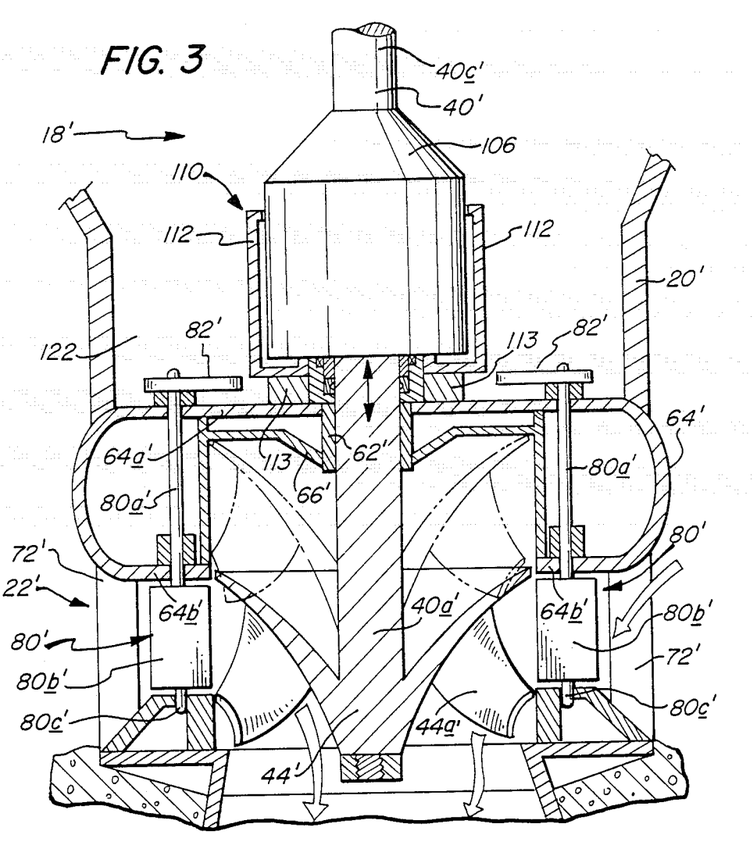
FIG. 3 is a view corresponding to that of FIG. 2 but showing a second embodiment of the invention.
Figure 3A:
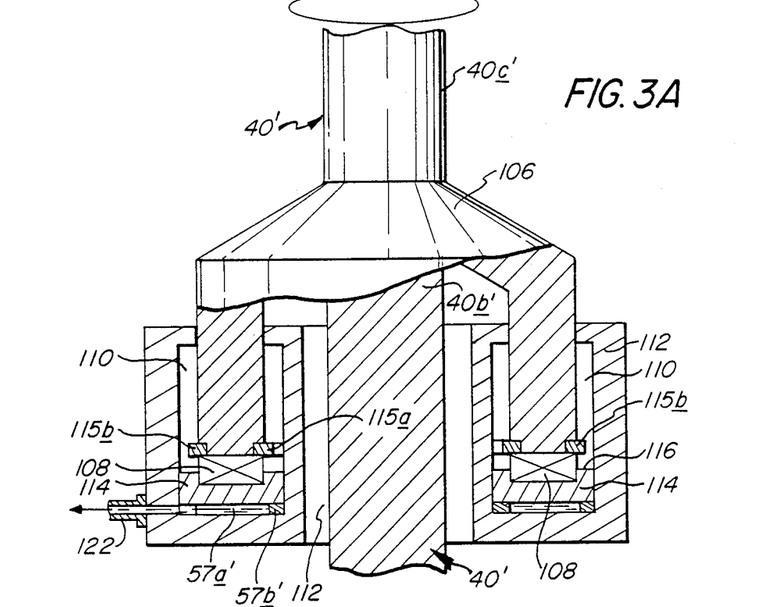
FIGS. 3A and 3B are partial cross-sectional views in elevation showing the shaft positioning means of the embodiment of FIG. 3 of an enlarged scale, FIG. 3A showing the runner-extended position and FIG. 3B the runner-retracted position.
Figure 3B:
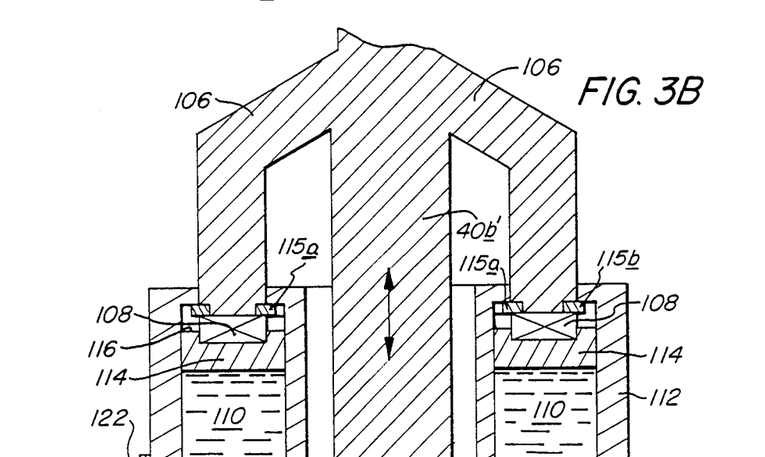

Referring now to FIGS. 3, 3A and 3B, there is shown an alternate embodiment of the invention wherein the cylinder chamber is of annular configuration and the axially accommodating connection is made directly between the first shaft and the second shaft. In FIG. 3, parts corresponding to or identical with those of the FIG. 2 embodiment are identically numbered except for the addition of a prime indicator thereto. FIGS. 3A and 3B are simplified and elements such as journal sleeves and bearings have been omitted therefrom. Thus, first shaft 40' has a runner 44' affixed to the runner end 40a' thereof and is mounted for rotation within a lower guide bearing 62' carried on a distributor support collar 64' and supported by a support web 66', substantially identically as in the FIG. 2 embodiment. The housing 20' is supported on the distributor support collar 64' and a plurality of stay vanes 72' supports the distributor support collar 64' which also has a plurality of wicket gates 80' mounted therein. However, in the FIGS. 3-3B embodiment, the piston segment 40b' of first shaft 40' has mounted thereon a thrust bearing 106 which is of generally cup-shaped configuration and is concentrically mounted upon first shaft 40' and terminates in an annular bearing face 108. An annular shaped piston chamber 110 is defined by chamber walls 112 and is supported upon a mounting ring 113 which is affixed to and carried by the head cover 64a' of distributor support collar 64'. The walls 112 of annular shaped cylindrical chamber 110 may also be laterally supported by web-like support means (not shown) analogous to bearing support means 56 of the FIG. 2 embodiment and similarly secured to the inner surface of housing 20'.

An axially accommodating connector (not shown) may connect the distal end 40c' of first shaft 40' to the piston end of a second shaft (not shown) corresponding to second shaft 42 of the FIG. 2 embodiment which second shaft is drivingly connected to the rotor of an electrostatic machine. Such connection will accommodate axial movement of first shaft 40' relative to such second shaft in addition to effectuating a driving rotational connection between them. Alternatively, shaft 40' may extend to be drivingly connected to the rotor and be axially slidable relative thereto.

An annular shaped piston head 114 is mounted for sliding movement within annular shaped piston chamber 110 and, as best seen in FIGS. 3A and 3B, has a race formed in the bearing surface (top surface as viewed in FIGS. 3-3B) 116 of piston head 114 to receive bearing face 108 of thrust bearing 106. Stop rings 115a and 115b are carried in grooves on thrust bearing 106 to serve as stops for upward travel of thrust bearing 106. Thrust bearing 106 may be integrally formed with first shaft 40' or it may be a separate piece secured thereto by suitable fastening means such as threaded bolts (not shown). Thrust bearing 106 thus rotates with shaft 40' but is axially fixed relative thereto.

Referring again to FIGS. 3A and 3B, a hydraulic fitting 122 is provided to admit hydraulic fluid into and withdraw it from annular shaped cylinder chamber 110 and to withdraw it therefrom. When it is desired to operate hydraulic generator 18' with the runner 44' thereof fully extended as shown in solid line in FIG. 3, hydraulic fluid is drained via fitting 122 from annular shaped cylinder chamber 110 as shown in FIG. 3A. With a generator positioned vertically as illustrated in FIG. 3, the weight of the machine and shaft will act to exert downward pressure on piston head 114 expelling the hydraulic fluid via fitting 122 and allowing runner 44' to fully extend to the position indicated in solid line in FIG. 3. When it is desired to retract runner 44', a suitable pump (not shown) connected in flow communication to hydraulic fitting 122 forces hydraulic fluid into fitting 122 thence into annular shaped piston chamber 110 as shown in FIG. 3B. Shaft 40' and runner 44' attached thereto are thus raised to the position shown in dot-dash outline in FIG. 3. Obviously, a plurality of fittings 122 may be dispersed around the periphery of annular shaped cylinder chamber 110. Further, guides (not shown) may be disposed vertically within cylinder chamber 110 and engage vertical grooves formed about both the inner and outer periphery of annular shaped piston head 114 to maintain piston head 114 in a horizontal position and avoid skewing thereof. Annular stop rings 57a' and 57b' may be positioned at the bottom (as viewed in FIGS. 3A and 3B) of annular shaped cylinder chamber 110 and provided with apertures therein aligned with hydraulic fittings 122 so as not to interfere with the flow of the hydraulic fluid into and out of cylinder chamber 110.

Figure 4:
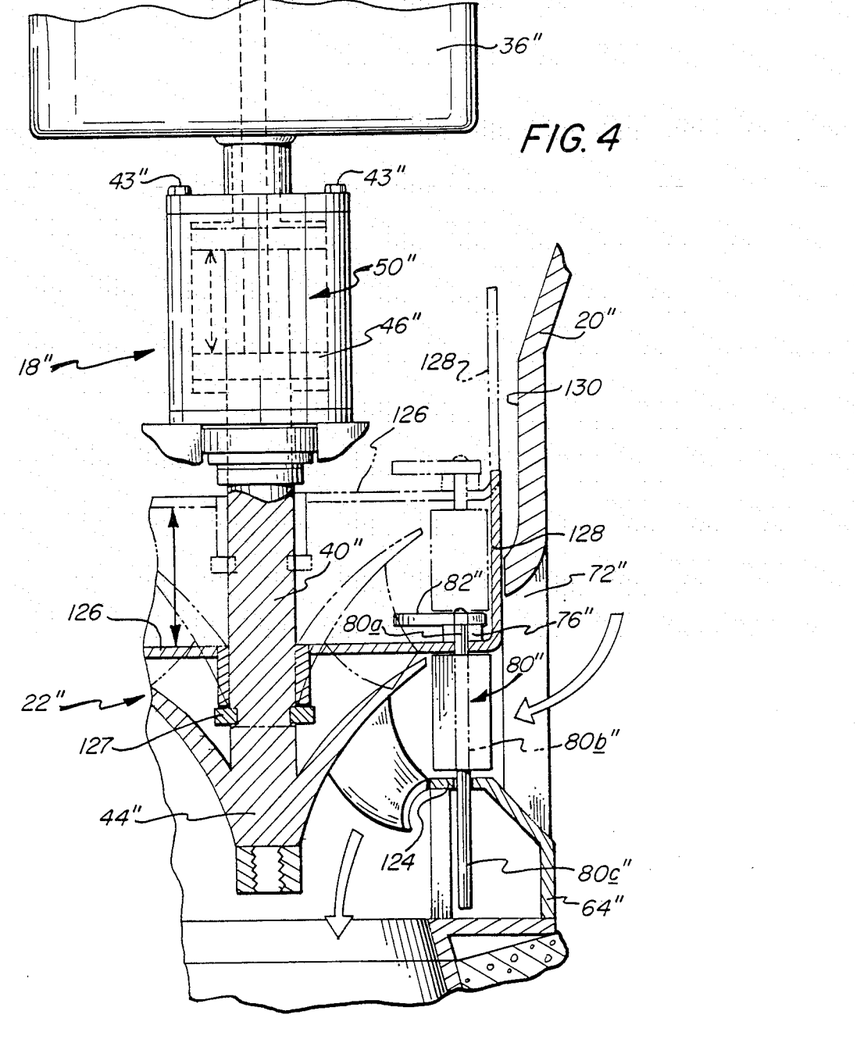
FIG. 4 is a view corresponding to that of FIG. 2 but showing a third embodiment of the invention.

Referring now to FIG. 4, there is shown another embodiment of the invention in which parts identical to those of the FIG. 2 embodiment are identically numbered except for the addition of a double prime indicator thereto. Thus, a runner 44" is mounted on a shaft 40" which has at its opposite end a piston head 46" contained within a cylinder chamber 50" which is rotatably connected by a collar 45" secured by fastener means 43" for driving electromotive machine 36". Distributor support collar 64" has a large circular aperture formed in its head cover which, in this embodiment, essentially comprises an upper annular rim 124. In lieu of the head cover of the FIG. 2 embodiment, a gate support plate 126 is provided which is of generally circular, cylindrical-shaped vessel configuration having a peripheral sidewall 128 extending therefrom which is dimensioned and configured for retraction into a throat portion 130 of housing 20" as indicated by the dot-dash line rendering. Gate support plate 126 is carried on first shaft 40" by a lock ring 127 mounted in a groove formed in first shaft 40" so that lock ring 127 and gate support plate 126 are axially fixed on shaft 40" and constrained to move axially with it. A plurality of bores is made about the periphery of support plate 126 and a plurality of bearings 76", having bores formed therethrough, are mounted over these bores. A corresponding plurality of aligned bores is formed within the upper annular rim 124 of distributor support collar 64" to receive the upper posts 80a" of wicket gates 80" which, as in the FIG. 2 embodiment, also comprise gate members 80b" and mounting stubs 80c". In the FIG. 4 embodiment however, mounting stubs 80c" are relatively much longer and upper posts 80a" are relatively much shorter than in the FIG. 2 embodiment, for a purpose to be described below. Linkage arms 82" are suitably connected to control means (not shown) in a manner similar or identical to that of the FIG. 2 embodiment. In the FIG. 4 embodiment, runner 44" is shown in its fully extended operating position to be rotated by water flowing through the distributor end 22" of hydraulic generator 18" as indicated by the unnumbered arrows. When runner 44" is to be retracted (which may be accomplished by the same type of hydraulic mechanism as illustrated with respect to FIG. 2) to the retracted position shown in dot-dash outline in FIG. 4, gate support plate 126 is constrained to move axially with shaft 40", thereby retracting wicket gates 80" along with runner 44" to their raised positions shown in dot-dash outline in FIG. 4. Mounting stubs 80c" are long enough to stay within the bores formed in upper annular rim 124 so that wicket gates 80" remain in alignment upon subsequent extending of runner 44" to the operating position. Stay vanes 72" are correspondingly elongated. The upper (as viewed in FIG. 4) half of stay vanes 72" is blocked by sidewall 128 when runner 44" is in its extended position but is open to water flow when it (and gate support plate 126) are in their upper, runner retracted position shown in dot-dash outline.

While the invention has been described in detail with respect to specific preferred embodiments thereof, variations to the specific embodiments may occur to those skilled in the art upon a reading and understanding of the foregoing and it is intended to include such variations within the scope of the appended claims.

What is claimed is:

1. In a hydroelectric generator comprising a housing, a rotatable runner shaft mounted on the housing and having a runner mounted in an axially fixed location on the runner shaft exteriorly of the housing for rotation of the runner shaft with the runner, the runner shaft being drivingly connected to an electromotive machine for operation thereof, the improvement comprising that the runner shaft is mounted for axial movement relative to the housing, and shaft positioning means are connected with the runner shaft to enable selective axial positioning of the runner shaft, and thereby of the runner, relative to the housing.

2. The generator of claim 1 wherein the shaft positioning means comprises a piston head carried on the runner shaft for movement of the runner shaft with the piston head, the piston head being mounted for sliding movement within a cylinder chamber, one or more hydraulic conduits connecting a source of hydraulic fluid to opposite sides of the piston head within the cylinder chamber, and pump means connected in flow communication with the conduits to pressurize the hydraulic fluid for selective axial positioning.

3. The generator of claim 2 wherein said runner shaft is a compound shaft comprising (a) a first shaft having a runner end at which the runner is carried and an opposite, piston end at which the piston head is carried, and (b) a second shaft having a connector end which is drivingly connected to the piston end of the first shaft and a machine end which is drivingly connected to the electromotive machine; said first and second shafts being drivingly connected to each other by an axially accommodating connector to accommodate axial movement of the first shaft relative to the second shaft.

4. The generator of claim 2 wherein the shaft positioning means comprises a thrust bearing carried on the runner shaft for axial movement of the runner shaft with the thrust bearing, the thrust bearing terminating in a bearing face disposed radially outwardly of the axis of rotation of the runner shaft, the bearing face being carried on the piston head for axial positioning of the thrust bearing, and thereby of the runner shaft.

5. The generator of claim 4 wherein the thrust bearing is cup-shaped and the bearing face thereof, the piston head and the cylinder chamber are of annular configuration.

6. The generator of claim 1 further including distributor means disposed about the periphery of the runner and connected with the runner shaft for axial movement of the distributor means with the runner shaft.

7. The generator of claim 1 further including distributor means disposed about the periphery of the runner and mounted independently of axial movement of the runner shaft whereby the positon of the distributor means is independent of axial positioning of the runner shaft.

8. The generator of claim 1 wherein the shaft positioning means comprises hydraulic means.

9. The generator of claim 1 mounted vertically with the runner at the bottom thereof and positioned at the inlet of a draft tube.

10. A hydroelectric generator comprising:
    (a) a housing having a rotatable runner shaft mounted thereon, the runner shaft comprising (1) a first shaft having a runner mounted thereon exteriorly of the housing for rotation of the runner shaft with the runner and axial movement of the runner with the runner shaft, and (2) a second shaft drivingly connected to the first shaft by an axially accommodating connector which accommodates axial movement of the first shaft relative to the second shaft; and
    (b) shaft positioning means connected to the first shaft to enable selective axial positioning thereof, and thereby of the runner, relative to the housing, the shaft positioning means comprising a hydraulically-operated piston head carried on the first shaft for movement of the first shaft therewith, the piston head being mounted for sliding movement within a cylinder chamber.

11. The generator of claim 10 wherein the axially accommodating connector comprises slide pins connecting the first shaft to the second shaft for rotation with each other.

12. The generator of claim 11 wherein the slide pins connect the first shaft to the cylinder chamber to permit axial movement of the first shaft relative to the cylinder chamber but constrain the cylinder chamber to rotate with the first shaft, and fastening means connect the second shaft to the cylinder chamber for rotation therewith.

13. The generator of claim 12 wherein the piston head is mounted at one end of the first shaft.

14. The generator of claim 10 including a thrust bearing mounted on the first shaft and terminating in an annular bearing face which is carried on the piston head, the piston head and the cylinder chamber being of annular configuration.

* * * * *

UNITED STATES PATENT AND TRADEMARK OFFICE
CERTIFICATE OF CORRECTION

PATENT NO. : 4,754,155
DATED : June 28, 1988
INVENTOR(S) : Henry K. Obermeyer

It is certified that error appears in the above—identified patent and that said Letters Patent is hereby corrected as shown below:

Column 2, line 34, replace "positon" with --position--

Column 2, line 51, delete "responding"

Column 2, line 66, after "FIG. 3", replace "of" with --on--

Column 3, line 26, after "and", replace "a" with --at--

Column 5, line 50, replace "80c" with --80c--

Column 6, line 61, replace "its runner are" with --its runner 44 are--

Column 10, line 14, replace "positon" with --position--

Signed and Sealed this

Seventeenth Day of January, 1989

Attest:

DONALD J. QUIGG

Attesting Officer

Commissioner of Patents and Trademarks